(12) United States Patent
Luebbers

(10) Patent No.: US 11,839,911 B2
(45) Date of Patent: Dec. 12, 2023

(54) METHOD OF MANUFACTURING A PERFORATED SHEET, PERFORATED SHEET, SHAPED PART AND PROCESSING DEVICE

(71) Applicant: LUEBBERS FTS GMBH, Bad Langensalza (DE)

(72) Inventor: Matthias Luebbers, Bad Langensalza (DE)

(73) Assignee: LUEBBERS FTS GMBH, Bad Langensalza (DE)

( * ) Notice: Subject to any disclaimer, the term of this patent is extended or adjusted under 35 U.S.C. 154(b) by 340 days.

(21) Appl. No.: 16/889,818

(22) Filed: Jun. 2, 2020

(65) Prior Publication Data

US 2020/0391272 A1    Dec. 17, 2020

(30) Foreign Application Priority Data

Jun. 5, 2019   (DE) .................... 10 2019 115 174.0

(51) Int. Cl.
*B21D 28/26*   (2006.01)
*B21D 28/24*   (2006.01)
*B23P 13/00*   (2006.01)
*B01J 8/44*    (2006.01)

(52) U.S. Cl.
CPC .............. *B21D 28/265* (2013.01); *B01J 8/44* (2013.01); *B21D 28/243* (2013.01); *B23P 13/00* (2013.01)

(58) Field of Classification Search
CPC .... B21D 28/265; B21D 28/243; B21D 53/00; B21D 28/10; B21D 31/02; B01J 8/44; B23P 13/00
See application file for complete search history.

(56) References Cited

U.S. PATENT DOCUMENTS

| | | | | |
|---|---|---|---|---|
| 683,793 A | | 10/1901 | Phillips et al. | |
| 3,090,088 A | * | 5/1963 | Foley | F16B 15/0046 411/467 |
| 3,111,977 A | * | 11/1963 | Kruger | B21D 28/243 174/40 CC |
| 3,458,355 A | * | 7/1969 | Radtke | H01M 4/745 429/242 |
| 4,068,366 A | * | 1/1978 | Hillesheim | B21D 31/046 428/596 |

(Continued)

FOREIGN PATENT DOCUMENTS

CH    655 256 A5    4/1986
GB    1094610 A    12/1967

OTHER PUBLICATIONS

DIN 24041, German Standard „Perforated plates—Dimensions, pp. 1-20 (2002), English Translation.

(Continued)

*Primary Examiner* — Sarang Afzali
*Assistant Examiner* — Darrell C Ford
(74) *Attorney, Agent, or Firm* — Norman B. Thot

(57) ABSTRACT

A method of manufacturing a perforated sheet which has at least one hole. The method includes introducing at least two spaced boreholes into a sheet, the at least two spaced boreholes being formed so that they each pass through a thickness of the sheet, introducing a continuous cut between the at least two spaced boreholes in the sheet, and bending open a section of the sheet which is adjacent to the continuous cut so as to form a hole.

8 Claims, 2 Drawing Sheets

(56) References Cited

U.S. PATENT DOCUMENTS

| | | | | |
|---|---|---|---|---|
| 5,587,077 | A * | 12/1996 | Aaltonen | B01D 29/31 |
| | | | | 29/896.6 |
| 6,293,134 | B1 * | 9/2001 | Johnson | B21D 19/088 |
| | | | | 72/335 |
| 7,534,501 | B2 * | 5/2009 | Durney | E04C 3/02 |
| | | | | 428/596 |
| 7,891,507 | B2 * | 2/2011 | Shetler | A47B 55/00 |
| | | | | 211/135 |
| 8,978,431 | B1 * | 3/2015 | Kernosky | B21D 28/10 |
| | | | | 72/370.27 |
| 9,376,809 | B1 * | 6/2016 | Trover | E04B 5/02 |
| 11,571,673 | B2 * | 2/2023 | Zhao | C07C 253/26 |
| 2003/0103108 | A1 * | 6/2003 | Liu | B41J 2/1634 |
| | | | | 347/47 |
| 2004/0244303 | A1 | 12/2004 | Seise, Jr. | |
| 2005/0061049 | A1 * | 3/2005 | Durney | B21D 11/08 |
| | | | | 72/324 |
| 2009/0159545 | A1 * | 6/2009 | Shetler | A47B 47/02 |
| | | | | 211/153 |
| 2010/0000952 | A1 * | 1/2010 | McKinney | A47B 96/02 |
| | | | | 29/525.01 |
| 2010/0126152 | A1 | 5/2010 | Hodgson | |
| 2011/0108533 | A1 * | 5/2011 | Boettcher | B23K 26/1476 |
| | | | | 219/121.72 |
| 2013/0119027 | A1 * | 5/2013 | Yerazunis | B23K 26/08 |
| | | | | 219/121.72 |
| 2015/0047406 | A1 * | 2/2015 | Cooper | B21D 22/00 |
| | | | | 72/338 |
| 2019/0091752 | A1 * | 3/2019 | Takishima | B21D 35/001 |
| 2020/0078045 | A1 * | 3/2020 | Wallace | A61B 17/320725 |
| 2023/0001865 | A1 * | 1/2023 | Yildirim | B60R 13/04 |

OTHER PUBLICATIONS

DIN 4185-2, German Standard „Terms and abbreviations for sieve trays—Part 2: Perforated plates, pp. 1-7 (2000), English Translation.

DIN 4185-2, German Standard: "Terms and abbreviations for sieve trays—Part 2: Perforated plates", pp. 1-5 (2003), English Translation.

DIN 8593-0, German Standard, Manufacturing processes joining—Part 0: General—Classification, subdivision, terms and definitions, pp. 1-5 (2003).

* cited by examiner

METHOD OF MANUFACTURING A PERFORATED SHEET, PERFORATED SHEET, SHAPED PART AND PROCESSING DEVICE

CROSS REFERENCE TO PRIOR APPLICATIONS

Priority is claimed to German Patent Application No. DE 10 2019 115 174.0, filed Jun. 5, 2019. The entire disclosure of said application is incorporated by reference herein.

FIELD

The present invention relates to a method of manufacturing a perforated sheet, wherein the manufactured perforated sheet comprises at least one hole. The present invention also relates to a perforated sheet, a shaped part, and to a processing device.

BACKGROUND

Perforated sheets are used in various forms and functions in industrial applications. Perforated sheets are, for example, used for screening, grading, filtering or dosing. In these applications, a perforated sheet is either installed directly in a processing plant, for example, as a distributor plate in a fluidized bed plant, or is first formed as a semi-finished product, for example, into a cylindrical filter element of a water filter.

In a previously-described manufacturing process, perforated sheets are, for example, produced from sheets or strips to be perforated via a wide press with which an entire row of holes is punched in the strip or sheet in one stroke. Round, square or other hole shapes can thereby be produced with straight hole flanks in the direction of passage.

US 683,793 describes the manufacture of a seat post for a bicycle in which two openings are formed in a punched sheet metal part and then connected by a slot. The slotted sheet is subsequently partially lifted by a suitable form in a punch or press.

CH 655 256 A5 describes a method for manufacturing grating disks for kitchen appliances in which holes are punched on a scribe, shells are erected by pressing out about half of the edge of the hole, and the shells are sharpened from the inside using a shaving punch.

Slotted perforated sheets and thin perforated sheets have also been previously described, whereby the thin perforated sheets can be designed, for example, with triangular or semi-elliptical openings. In the known perforated sheets and particularly in fine perforated sheets, where the hole width is significantly smaller than the sheet thickness, problems occur at the inner edges and/or inner corners of the hole to the solid sheet due to the fact that bacteria and/or inorganic and organic substances accumulate in these areas. These encrustations and accumulations of bacteria lead to hygiene problems and complaints, in particular when such perforated sheets are used for processing in the food and/or pharmaceutical industry.

SUMMARY

An aspect of the present invention is to improve upon the prior art.

In an embodiment, the present invention provides a method of manufacturing a perforated sheet which comprises at least one hole. The method includes introducing at least two spaced boreholes into a sheet, the at least two spaced boreholes being formed so that they each pass through a thickness of the sheet, introducing a continuous cut between the at least two spaced boreholes in the sheet, and bending open a section of the sheet which is adjacent to the continuous cut so as to form a hole.

BRIEF DESCRIPTION OF THE DRAWINGS

The present invention is described in greater detail below on the basis of embodiments and of the drawings in which.

DETAILED DESCRIPTION

Figure 1:
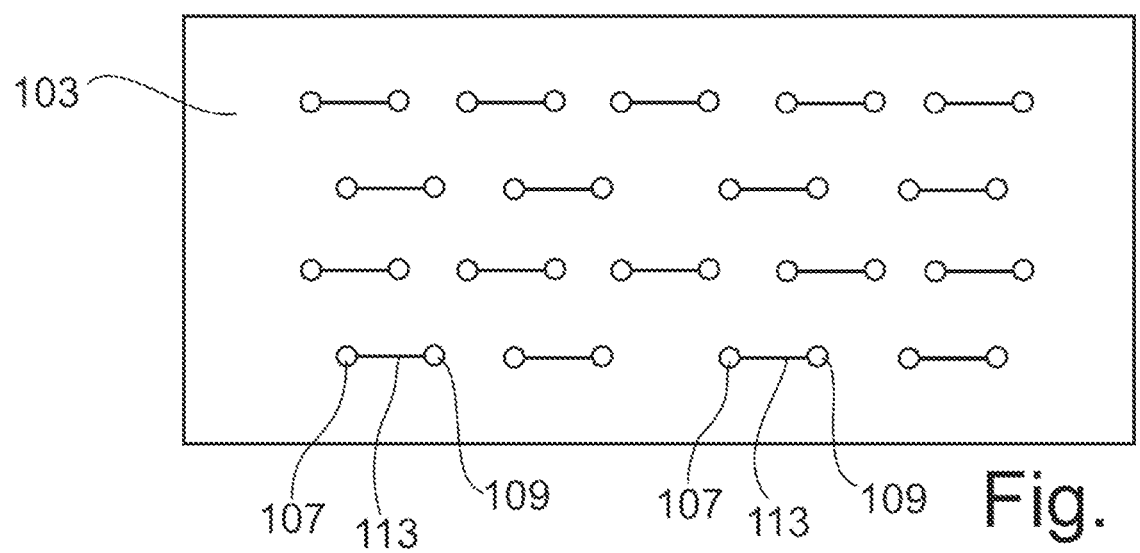
FIG. 1 shows a highly schematic representation of a sheet in top view with boreholes and continuous cuts.
Figure 2:
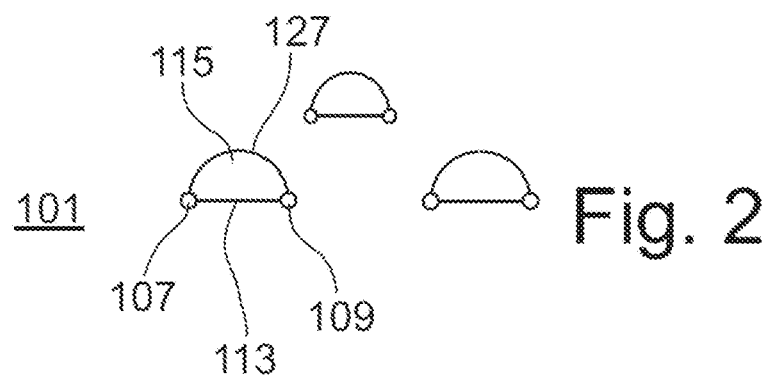
FIG. 2 shows a highly schematic sectional representation of a perforated sheet in a lateral view.

The present invention provides a method for manufacturing a perforated sheet, wherein the manufactured perforated sheet comprises at least one hole. The method has the following steps:

Introducing two spaced boreholes into a sheet, wherein the boreholes are formed so that they pass through a thickness of the sheet;

Introducing a continuous cut between the two spaced boreholes in the sheet; and

Bending open a section of sheet metal adjacent to the continuous cut so that a hole is formed.

The process according to the present invention provides a perforated sheet in which the flow through the hole is stronger than in the prior art. Since a defined surface is produced in the solid sheet when the boreholes are provided as start and end areas of the later hole, the flow through and/or around this surface is increased and thus prevents an accumulation of bacteria, inorganic and/or organic substances at the respective edge and corner areas of the hole formed by the boreholes.

It is particularly advantageous that the shape and size of the borehole is adapted to the shape and size of the sheet section adjacent to the continuous cut, wherein the latter is bent up accordingly. Since the bending of the sheet section can be carried out in a defined manner both in the vertical direction and in the horizontal direction in relation to the dimensions of the sheet, the shape of the hole can be determined in relation to the shape of the boreholes and both can be designed so that the flow through both the areas of the boreholes and the hole itself is optimal. Areas which are subject to laminar flow when a fluid and/or particles pass through the hole are consequently avoided even in the corner and edge areas of the hole.

It is also particularly advantageous that the orientation and/or shape of the hole with its two openings as well as the arrangement of the hole on the sheet can be flexibly and freely manufactured. The upper and lower sides of the perforated sheet can be formed differently by being bent open. The underside of the perforated sheet can, for example, be designed smooth with a smooth lower opening of the hole, while on the upper side of the sheet, the bent up sheet section and the upper opening of the hole protrude beyond the thickness of the sheet. The upper opening of the hole can, for example, additionally be horizontal in its initial direction and thus parallel to the horizontal orientation of the sheet. The bent up sheet metal section can, however, also comprise a straight upward opening on the upper side.

The hole width in horizontal alignment of the sheet is thus determined by the two spaced boreholes, while the vertical expansion of the hole is mainly carried out by bending up the sheet section adjacent to the continuous slot.

An important concept of the present invention is based on the fact that by introducing holes with a defined shape and surface, the inner edges of the hole are designed so that an optimum flow through the hole is also achieved in the corner and/or edge areas, thereby preventing an accumulation of bacteria, inorganic and/or organic substances. The boreholes can additionally prevent tearing or fraying of cracks, so that no bacteria can accumulate in these cracks.

The following terms must be explained.

A "perforated sheet" (also known as a "perforated plate") is, in particular, a sheet which comprises continuous holes through its thickness. The holes are in particular introduced into the sheet in a regular arrangement. A perforated sheet also includes perforated plates according to DIN 4185-2 and 24041, according to which a perforated plate is a plate which is given similar openings in regular arrangements by punching, perforating or drilling. A perforated sheet is in particular also understood to be a sheet which comprises inclined, curved or conically shaped hole flanks in the direction of passage. The hole width can thus narrow or widen continuously or discontinuously in the direction of passage. The perforated sheeting in particular comprises different top and bottom sides. The bent up area of the sheet section and thus the corresponding hole flank is in particular only disposed on the upper or lower side of the perforated sheet. In a perforated sheet with several holes, all bent sheet sections can, for example, be disposed on one side of the sheet to form the hole. The bent sheet sections can, for example, also be arranged alternately on the upper or lower side of the perforated sheet in a regular distribution. The bent sheet sections can, for example, be disposed on the product side of the perforated sheet which is used in an industrial production process to form the respective holes, and, for example, stand out above the sheet thickness in a scaly or semicircular shape.

The perforated sheet in particular comprises a perforated sheet thickness in the range of 0.2 mm to 5.0 mm. The sheet thickness can, for example, be significantly greater than the hole width, so that a suitable thin perforated sheet can be produced.

The perforated sheet in particular comprises unalloyed steel, duplex steel, stainless steel, nickel steel with other nickel alloys, aluminum, silver, tantalum, niobium and/or other materials.

In order to further improve the flow through the boreholes and the hole, the perforated sheet can be hardened and the surface further smoothed via a surface post-treatment after the hole has been bent open. Such an after-treatment can, for example, be carried out by electropolishing.

A "hole" is in particular understood to be an opening passing through the thickness of a perforated sheet and/or sheet. The hole can in particular comprise any cross-sectional area and/or the hole width can change in the direction of passage. A hole in particular comprises a round cross-sectional shape. The hole in particular has a diameter (hole width) in the range of 0.03 mm to 8.00 mm, for example, of 0.10 mm to 3.00 mm.

A "sheet" is in particular a rolled product of metal whose width and length are much greater than its thickness. A sheet is in particular a panel, a plate, a strip and/or a coil (coiled metal strip). A sheet in particular has a sheet thickness and a material which meets the requirements of the perforated sheet to be produced. A sheet thus in particular has the sheet thickness and materials mentioned above for a perforated sheet. A sheet is in particular a thin sheet with a thickness of <3.0 mm, a middle sheet with a thickness in the range of 3.0 mm to ≤4.75 mm, or a heavy sheet with a thickness greater than 4.75 mm.

A "borehole" is in particular a continuous perforation through a thickness of the sheet metal. The borehole in particular comprises a round cross-section. The borehole can also have any shape other than a cross-section. The borehole in particular has a diameter in a range of 0.01 to 4.00 mm.

The borehole is in particular drilled into the sheet by a drill, a drill eroder, a punch, a water jet drill and/or by a laser drilling.

A "continuous cut" is in particular an elongated continuous perforation through the thickness of the sheet. The continuous cut in particular ends in the horizontal direction in the two spaced boreholes. A continuous cut can also be a continuous notch, a continuous groove and/or a continuous slit through the thickness of the sheet.

A "sheet section adjacent to the continuous cut" is understood to in particular mean the area of the sheet which, when the sheet is viewed from above, is adjacent to one of the two longitudinal sides of the cut.

"Bending up" in particular means that at least one of the two sheet sections adjacent to the continuous cut is bent up so that a hole with a special shape is formed. By bending up the sheet section or both sheet sections adjacent to the cut, the sheet section or sections is or are bent into a specific shape. The sheet section is in particular bent simultaneously or successively in both a horizontal direction and in a vertical direction relative to a lying sheet. The adjacent sheet section is in particular bent up so that a triangular, a semicircular, a semi-elliptical or otherwise a curved opening is formed on one side of the sheet and/or perforated sheet. The bending is carried out, for example, via a punch or a bending tool in a press or in a bending machine. Bending up can also be a die bending, a roll bending or a free bending.

In an embodiment of the process of the present invention, an introduction of additional spaced holes and additional continuous cuts at different positions on the sheet and a bending to form additional holes are carried out.

A perforated sheet with a plurality of holes can thus be produced. It is advantageous from a manufacturing point of view that all boreholes are drilled first, followed by the formation of all cuts, and then the bending of the respective adjacent sheet sections at the corresponding continuous cuts, so that tool changes are minimized.

When forming a large number of holes, it is advantageous if the holes are evenly distributed over the surface of the sheet so that different hole pitches and feed rates can be set depending on requirements. The smallest dimensions for the hole pitch and feed rate in particular determine the maximum open area of the perforated sheet. The open area as the ratio of the area of the openings on one side of the sheet to the total area of the sheet on this side of the sheet is in particular 1.0% to 40.0%, for example, 10.0% to 30.0%. The number of holes in the perforated sheet can also be used to adjust the pressure drop according to the respective application conditions.

The "additional boreholes" correspond to the borehole defined above, the "additional continuous cuts" correspond to the continuous cut defined above, and the "additional holes" correspond to the hole defined above.

In order to achieve high dimensional accuracy and high surface quality, the introduction of the boreholes and/or the cut or cuts is performed via a beam source unit.

The boreholes and/or cuts can thus be introduced by water jets and/or by laser beams.

A "beam source unit" is in particular a machine for water jet cutting, laser beam fusion cutting, flame cutting and/or plasma fusion cutting.

In an embodiment of the method of the present invention, the introduction of the boreholes can, for example, be carried out at an angle in a range from 30° to 60°, for example, from 40° to 50°, to a horizontal orientation of the sheet.

Advantageously sloping hole flanks are thereby formed by introducing the boreholes in relation to a horizontally positioned sheet and the flow is optimally guided when passing through the hole both at the inlet opening and at the outlet opening of the hole. An optimum flow separation at an upper hole edge of the bent sheet section can additionally be achieved at the upper opening of the hole.

An "angle" (also called a "drilling angle") relates in particular to a horizontal alignment of the sheet, for example, to the lower or upper edge of a lying sheet.

In order to set a stronger flow in the area of the boreholes in a targeted manner, the boreholes are each introduced with a larger borehole diameter than a cutting width of the corresponding cut.

The "cut width" is in particular the extension of the cut transversely to the longitudinal direction of the cut.

In an embodiment of the method of the present invention, the introduction of the respective two spaced boreholes and thus the formation of the holes is carried out with a certain arrangement over a surface of the sheet, in particular in the form of a spiral and/or as segmental arches.

By distributing and introducing the paired boreholes and thus the formed holes with a predetermined arrangement over the surface of the sheet, specific flows through the holes of the manufactured perforated sheet and/or directed flows within a processing device are realized. The perforated sheet can thus additionally comprise predefined areas with a low and/or high flow rate as well as local flows and/or a flow gradient over the surface of the sheet during its use.

In order to obtain an outlet of the flow in a certain direction when using the manufactured perforated sheet, the continuous cut or cuts are introduced at an angle of 10° to 170°, in particular 30° to 150°, for example, 50° to 130°, to a or the horizontal orientation of the sheet.

The continuous cuts and thus the formed holes can thus have different and/or equal angles with a specific orientation to the horizontal surface of the sheet so that, when using the manufactured perforated sheet, specifically oriented flows, such as radial flows, are generated. This means that the manufactured holes can open alternately in opposite directions, for example, at an angle of 60° from the horizontal surface of the sheet.

The present invention also provides a perforated sheet which is manufactured according to a previously described method.

A perforated sheet is accordingly provided in which the outer corners and/or edges of the hole, which are adjacent to the solid sheet of the perforated sheet, are designed so that an accumulation of bacteria, organic and/or inorganic substances is prevented due to an optimum flow through the corresponding corner and/or edge areas of the hole. The manufactured perforated sheet can thus also be used in fields where hygiene is essential, such as in the pharmaceutical and/or food industry.

The present invention also provides a shaped part which is manufactured by joining and/or forming a previously described perforated sheet.

A distributor for a fluidized bed plant or a perforated plate formed into a filter element can thus be produced as a shaped part using several perforated sheets. Less maintenance and cleaning of the shaped part is therefore necessary due to the improved flow through the shaped part. The shaped part can in particular also be used in fields and/or plants where hygiene is paramount, such as the production of powdered milk for baby food.

The term "joining" in particular refers to a manufacturing technique for joining the perforated sheet to itself, for example, to form a cylindrical shape, with one or more other perforated sheets or other components. Joining in principle means that two or more solid bodies with a geometrically defined shape are durably joined. Joining in particular includes all process groups defined under DIN 8593. Joining in particular includes welding, soldering, gluing, riveting and/or screwing.

The term "forming" in particular refers to a method in which the perforated sheet is purposefully formed into a different shape. The forming itself takes place without removing material from the perforated sheet. Forming in particular includes rolling, open-die forging, drop forging, pressing, deep drawing and/or bending.

The present invention also provides a processing device, in particular a fluidized bed device, the processing device comprising a previously described perforated sheet and/or a previously described shaped part.

By using the perforated sheet and/or the shaped part according to the present invention, a faster flow and a more efficient processing can thus be achieved in a processing device.

The improved flow through the shaped part and/or perforated sheet also allows for a more intensive heat and/or mass exchange in chemical and/or physical processes, so that the chemical and/or physical conversion can be achieved more quickly and/or the corresponding plant can be dimensioned smaller.

A "processing device" (also a "processing plant") is in particular any device or plant in which a substance, a semi-finished product or a product is chemically and/or physically modified and thus processed. A processing device may, for example, be a filtering, screening, a centrifugation, a dewatering, a separating, a drying and/or a cooling installation.

The present invention is explained in greater detail below based on exemplary embodiments as shown in the drawings.

A sheet 103 comprises a bottom side 123, an upper side 125, and a sheet thickness 105. To manufacture a perforated sheet 101, a plurality of boreholes are introduced into the sheet 103 (shown in FIG. 1 in a top view) in a distributed manner using a drill, wherein a respective first borehole 107 is disposed at a defined distance from a second borehole 109. The first borehole 107 and the second borehole 109 are introduced with a drilling angle 111 of 45° to the lower edge of the sheet 103 and pass completely through a sheet thickness 105 of the sheet 103. The respective first borehole 107 and the second borehole 109 have a round cross-section.

The spaced first borehole 107 and the second borehole 109 are subsequently respectively connected by a respective cut 113, wherein each cut 113 passes completely through the sheet thickness 105. All cuts 113 are thereby made in the sheet 103 with a laser beam cutter. All first boreholes 107 and all second boreholes 109 have a drilling diameter of 3.0 mm, while all cuts 113 have a cutting width of 1.5 mm.

Figure 3:
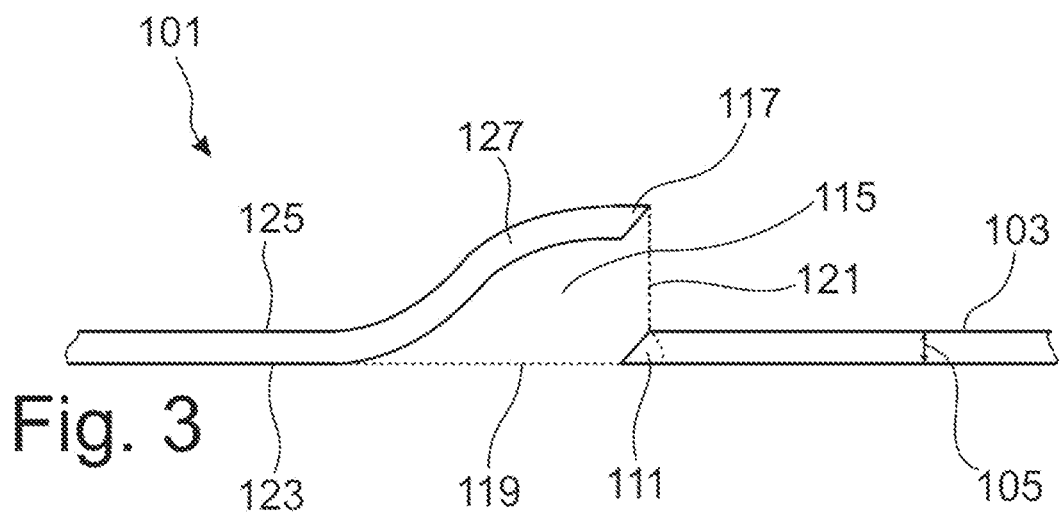
FIG. 3 shows a highly schematic sectional representation of a section of a perforated sheet with a hole in longitudinal section.

Once all the cuts 113 have been made, all the sheet sections 127 adjacent to the same longitudinal side of the cuts 113 are bent upwards one after the other by the action of a punch from the bottom side 123 so as to create a hole 115 with a bottom opening 119 and an upper opening 121 aligned horizontally relative to the alignment of the sheet 103. This provides a textured surface on the upper side 125 of the sheet 103 (see FIG. 3) and a smooth bottom side 123 of the sheet 103 with a flush bottom opening 119. Additional holes are shaped accordingly until the perforated sheet 101 has the desired number of holes 115.

Because of the drilling angle 111 of 45°, an inclined hole edge 117 is formed at each hole 115, which, due to its inclined configuration, causes an optimal flow separation when a fluid passes from the bottom opening 119 to the upper opening 121 of each hole 115.

The manufactured perforated sheet 101 is used as a distributor for gas distribution in a fluidized bed plant for drying milk powder (not shown in the drawings). The drying gas is here supplied on the bottom side 123 of the perforated sheet 101, and flows through the respective hole 115 of the perforated sheet 101 essentially horizontally out of the respective upper opening 121 of the hole 115. The configuration of the perforated sheet 101 with the upper curved sheet sections 127 and the horizontally aligned upper openings 121 of the holes 115 prevents a direct entry and a sedimentation of milk powder vertically from above into the respective hole 115. The hole flanks defined by the first boreholes 107 and second boreholes 109 also prevent an accumulation of bacteria and/or milk powder. Hygiene-related contaminations are consequently avoided by the perforated sheet 101 according to the present invention.

Figure 4:
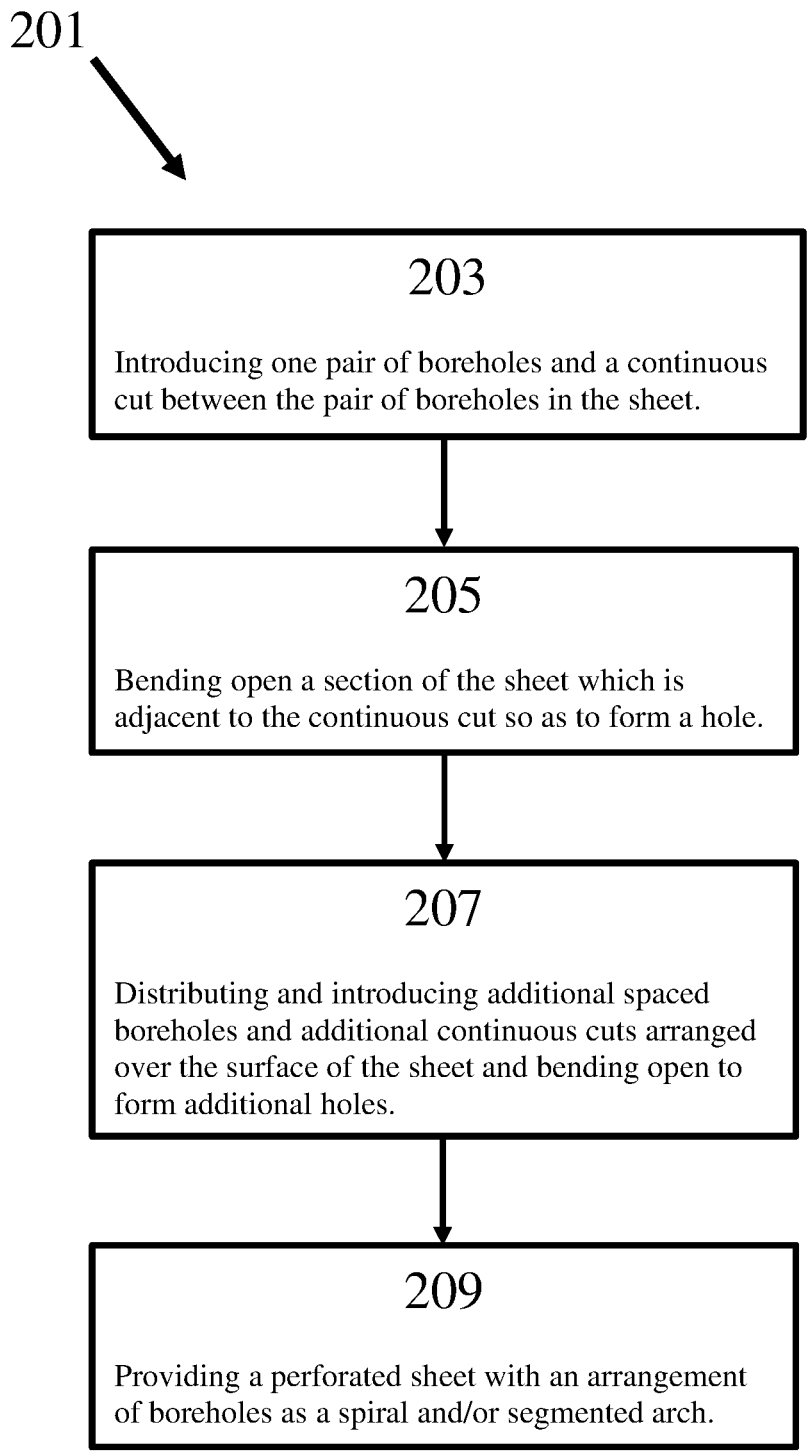
FIG. 4 shows a flow chart of a method of manufacturing a perforated sheet with a certain arrangement of the formed holes.

FIG. 4 shows a flow chart of the method 201 of manufacturing a perforated sheet with a certain arrangement of the formed holes of the present invention. The method 201 includes introducing one pair of boreholes and a continuous cut between the pair of boreholes in the sheet 203, bending open a section of the sheet which is adjacent to the continuous cut so as to form a hole 205, distributing and introducing additional spaced boreholes and additional continuous cuts arranged over the surface of the sheet and bending open to form additional holes 207, so as to thereby provide a perforated sheet with an arrangement of boreholes as a spiral and/or segmented arch 209.

The present invention is not limited to embodiments described herein; reference should be had to the appended claims.

LIST OF REFERENCE NUMERALS

101 Perforated sheet
103 Sheet
105 Sheet thickness
107 First borehole
109 Second borehole
111 Drilling angle
113 Cut
115 Hole
117 Included hole edge
119 Bottom opening
121 Upper opening
123 Bottom side (of the sheet)
125 Upper side (of the sheet)
127 Sheet section

The invention claimed is:

1. A method of manufacturing a perforated sheet, the method comprising:

introducing one pair of boreholes which are spaced apart from each other into a sheet, each borehole of the one pair of boreholes being formed with a round cross-section so that each of the one pair of boreholes pass through a thickness of the sheet;

introducing a continuous cut between the one pair of boreholes in the sheet so as to form two sheet sections adjacent to the continuous cut;

bending up at least one of the two sheet sections adjacent to the continuous cut so as to form a hole with a specific shape;

introducing additional pairs of boreholes which are spaced apart from each other and a respective additional continuous cut between the additional pairs of boreholes at different positions of the sheet; and bending up at least one of the two sheet sections adjacent to the respective additional continuous cuts so as to form additional holes with the specific shape, wherein, each of the one pair of boreholes and the additional pairs of boreholes, and their respective continuous cut and additional continuous cuts, are arranged so as to be spaced apart from each other.

2. The method as recited in claim 1, wherein the introducing of the additional pairs of boreholes which are spaced apart from each other is performed with a specific arrangement over a surface of the sheet.

3. The method as recited in claim 2, wherein the specific arrangement is one or more of a spiral and segmental arches.

4. The method as recited in claim 1, wherein the introducing of the one pair of boreholes which are spaced apart from each other into the sheet and the additional pairs of boreholes which are spaced apart from each other into the sheet is performed at an angle of from 30° to 50° in relation to a horizontal orientation of the sheet.

5. The method as recited in claim 1, wherein one or more of the, introducing of the one pair of boreholes which are spaced apart from each other into the sheet and the continuous cut between the one pair of boreholes which are spaced apart from each other in the sheet, and introducing the additional pairs of boreholes which are spaced apart from each other into the sheet and the respective additional continuous cut between the additional pairs of boreholes which are spaced apart from each other in the sheet, is performed via a beam source unit.

6. The method as recited in claim 1, wherein, each borehole of the one pair of boreholes has a diameter which is larger than a width of the continuous cut between the one pair of boreholes in the sheet, and each borehole of the additional pairs of boreholes has a diameter which is larger than a width of the respective additional continuous cut between the additional pairs of boreholes in the sheet.

7. The method as recited in claim 1, wherein the introducing of the continuous cut and of the additional continuous cuts is performed at an angle of 10° to 170° in relation to a horizontal orientation of the sheet.

8. The method as recited in claim 1, wherein, only one of the two sheet sections which is adjacent to the continuous cut and adjacent to the respective additional continuous cuts is bent up so as to form the hole with the specific shape, and the specific shape of the hole is a triangular hole, a semicircular hole, a semi-elliptical hole, or a hole having a curved opening.

* * * * *